United States Patent
Li et al.

(10) Patent No.: US 10,609,632 B2
(45) Date of Patent: Mar. 31, 2020

(54) SRS SENDING METHOD, SRS SENDING DEVICE AND TERMINAL

(71) Applicant: YULONG COMPUTER TELECOMMUNICATION SCIENTIFIC (SHENZHEN) CO., LTD., Shenzhen (CN)

(72) Inventors: Ming-Ju Li, Shenzhen (CN); Ya-Jun Zhu, Shenzhen (CN); Yun-Fei Zhang, Shenzhen (CN)

(73) Assignee: YULONG COMPUTER TELECOMMUNICATION SCIENTIFIC (SHENZHEN) CO., LTD., Shenzhen (CN)

(*) Notice: Subject to any disclaimer, the term of this patent is extended or adjusted under 35 U.S.C. 154(b) by 0 days.

(21) Appl. No.: 16/071,494

(22) PCT Filed: Sep. 28, 2016

(86) PCT No.: PCT/CN2016/100679
§ 371 (c)(1),
(2) Date: Jul. 20, 2018

(87) PCT Pub. No.: WO2017/124771
PCT Pub. Date: Jul. 27, 2017

(65) Prior Publication Data
US 2019/0037483 A1    Jan. 31, 2019

(30) Foreign Application Priority Data
Jan. 20, 2016   (CN) .......................... 2016 1 0041411

(51) Int. Cl.
*H04W 48/16* (2009.01)
*H04J 11/00* (2006.01)
(Continued)

(52) U.S. Cl.
CPC ......... *H04W 48/16* (2013.01); *H04J 11/0069* (2013.01); *H04L 5/0048* (2013.01);
(Continued)

(58) Field of Classification Search
CPC ............. H04W 76/27; H04W 72/0446; H04W 72/042; H04W 48/16; H04W 72/0453;
(Continued)

(56) References Cited

U.S. PATENT DOCUMENTS

| 2015/0085797 A1 | 3/2015 | Ji et al. |
| 2016/0007323 A1* | 1/2016 | Suzuki .................. H04L 5/0053 370/329 |

(Continued)

FOREIGN PATENT DOCUMENTS

| CN | 101931456 A | 12/2010 |
| CN | 103416012 A | 11/2013 |
| CN | 104955158 A | 9/2015 |

*Primary Examiner* — Brian D Nguyen
(74) *Attorney, Agent, or Firm* — ScienBiziP, P.C.

(57) ABSTRACT

The present disclosure provides a Sounding Reference Signal (SRS) sending method when a Long Term Evolution (LTE) system works with a frame structure 3 in an unlicensed frequency band, a SRS sending device, and a terminal, and the SRS sending method when the LTE system works with the frame structure 3 in the unlicensed frequency band includes: determining a type of a target subframe to send a SRS; according to the type of the target subframe, selecting a target symbol in the target subframe for sending the SRS; sending the SRS through the target symbol. According to the technical solution of the present disclosure, when the LTE system works in the unlicensed frequency band, a normal transmission of the SRS can be ensured, thereby ensuring the measurement accuracy of the uplink channel quality, and improving the uplink throughput of the LTE system.

20 Claims, 4 Drawing Sheets

(51) Int. Cl.

| | |
|---|---|
| *H04L 25/02* | (2006.01) |
| *H04L 27/00* | (2006.01) |
| *H04L 5/00* | (2006.01) |
| *H04W 76/27* | (2018.01) |
| *H04W 16/14* | (2009.01) |
| *H04W 72/04* | (2009.01) |
| *H04W 48/10* | (2009.01) |

(52) U.S. Cl.
CPC .......... *H04L 5/0051* (2013.01); *H04L 5/0053* (2013.01); *H04L 25/0224* (2013.01); *H04L 25/0226* (2013.01); *H04L 27/0006* (2013.01); *H04W 16/14* (2013.01); *H04W 72/042* (2013.01); *H04W 72/0446* (2013.01); *H04W 72/0453* (2013.01); *H04W 76/27* (2018.02); *H04W 48/10* (2013.01)

(58) Field of Classification Search
CPC .. H04W 16/14; H04W 48/10; H04L 25/0224; H04L 27/0006; H04L 5/0051; H04L 5/0053; H04L 5/0048; H04J 11/0069
See application file for complete search history.

(56) References Cited

U.S. PATENT DOCUMENTS

| | | | |
|---|---|---|---|
| 2016/0219534 A1* | 7/2016 | Hao | H04W 52/325 |
| 2016/0227491 A1* | 8/2016 | Park | H04W 52/325 |
| 2017/0280331 A1* | 9/2017 | Gou | H04L 5/0007 |
| 2017/0303220 A1* | 10/2017 | Sadeghi | H04L 5/0053 |
| 2018/0206241 A1* | 7/2018 | Matsumoto | H04W 16/14 |
| 2019/0098605 A1* | 3/2019 | Seo | H04W 72/02 |

\* cited by examiner

FIG. 4 ize SRS SENDING METHOD, SRS SENDING
DEVICE AND TERMINAL

CROSS-REFERENCE TO RELATED APPLICATIONS

This application claims priority of Chinese Patent Application No. 201610041411.4, entitled "SRS sending method, SRS sending device and terminal" filed on Jan. 20, 2016 in the SIPO (State Intellectual Property Office of the People's Republic of China), the entire contents of which are incorporated by reference herein.

FIELD

The present disclosure relates to a technical field of communication, specifically a Sounding Reference Signal (SRS) sending method when a Long Term Evolution (LTE) system works with a frame structure 3 in an unlicensed frequency band, a SRS sending device when the LTE system works with frame structure 3 in the unlicensed frequency band, and a terminal.

BACKGROUND

At present, 3 GPP provides a concept of Long Term Evolution assisted access (LAA), which is used for an unlicensed frequency spectrum with the help of an Long Term Evolution (LTE) authorization frequency spectrum. When a LTE network uses an unlicensed frequency band, one of the key points is to ensure that the LAA system can coexist with existing access technology (e.g., Wi-Fi) on a fair and friendly basis. A traditional LTE system does not have a listen before talk (LBT) mechanism to avoid collision, in order to better coexist with the Wi-Fi, the LTE system needs an LBT mechanism. In this way, if the LTE detects that a channel on the unlicensed frequency spectrum is busy, the frequency band cannot be occupied. When the channel is detected to be idle, it can be occupied.

As uplink and downlink configuration of traditional time-division duplexing (TDD) is fixed, that is, there are only 7 fixed subframe allocation modes, thus, when the unlicensed frequency spectrum is used in a TDD way, a ratio of time slotting allocations of uplink and downlink is not flexible enough.

In order to better adapt to dynamic changes of uplink and downlink business and the LBT mechanism, for example, when sending data through a Physical Downlink Shared Channel (PDSCH), maximum channel occupation time of the downlink could be 8 ms or 10 ms. If a downlink subframe is converted to an uplink subframe during sending data, a LBT channel detection may be re-executed, this will inevitably lead to the channel being taken away by other systems (e.g., Wi-Fi). Related technologies provide a complete dynamic uplink and downlink subframe configuration, which is frame structure 3, the frame structure 3 is a frame structure used by Secondary cell (Scell) in the LAA system, and each subframe can be changed to an uplink subframe or to a downlink subframe at any time in the frame structure 3.

In this case, there is the a problem that there may be only one uplink subframe or Uplink Pilot Time Slot (UpPTS) or maybe even no uplink subframe or UpPTS in a 10 ms frame. For this case, how to ensure a Sounding Reference Signal (SRS) to be sent normally for ensuring measurement accuracy of uplink channel quality becomes a technical problem to be solved.

SUMMARY

The present disclosure is based on at least one of the above technical problems, and provides a new Sounding Reference Signal (SRS) transmission solution when a Long Term Evolution (LTE) system works in an unlicensed frequency band with a frame structure 3. Thus, when the LTE system works in the unlicensed frequency band, normal transmission of the SRS can be ensured, measurement accuracy of uplink channel quality can be ensured, and uplink throughput of the LTE system can be improved.

According to a first aspect of the present disclosure, a SRS sending method when a LTE system works with a frame structure 3 in an unlicensed frequency band is provided. This includes: determining a type of a target subframe that is going to send a SRS; selecting a target symbol in the target subframe for sending the SRS according to the type of the target subframe; sending the SRS through the target symbol.

In the technical solution, by selecting the target symbol in the target subframe for sending the SRS according to the type of the target subframe, it is possible to select an appropriate symbol in the target subframe for sending the SRS according to the type of the target subframe that may be used for sending the SRS, and then when the LTE system works in an unlicensed frequency band, a normal transmission of the SRS can be ensured, thereby ensuring the measurement accuracy of the uplink channel quality, and improving the uplink throughput of the LTE system.

A solution for selecting the target symbol in the target subframe for sending the SRS mainly includes the following:

Solution 1:

In the above technical solution, preferably, selecting the target symbol in the target subframe for sending the SRS according to the type of the target subframe, specifically includes: when the target subframe is determined to be an uplink subframe, selecting a last symbol in the target subframe as the target symbol.

In the technical solution, if the target subframe is just an uplink subframe, the SRS can be sent at the last symbol in the uplink subframe.

In the above technical solution, preferably, the method further includes: receiving a high layer signaling and/or a downlink control information (DCI) signaling sent by a base station for indicating an uplink subframe configuration, and determining whether the target subframe is an uplink subframe according to the high layer signaling and/or the DCI signaling; or Receiving an uplink scheduling instruction sent by the base station, and determining whether the target subframe is an uplink subframe according to an indication of the uplink scheduling instruction.

Specifically, in one embodiment of the present disclosure, the base station can explicitly notify the terminal of a configuration situation of the uplink subframe through the high layer signaling and/or the DCI signaling, and then the terminal can determine whether the target subframe is an uplink subframe according to the high layer signaling and/or the DCI signaling. In another embodiment of the present disclosure, when the base station sends the uplink scheduling instruction (UL grant) to the terminal, the base station can notify the terminal to send uplink data at a corresponding subframe position, that is, the terminal is notified which subframes is an uplink subframes, then the terminal can determine whether the target subframe is an uplink subframe accordingly.

Solution 2:

In the above technical solution, preferably, selecting a target symbol in the target subframe for sending the SRS according to the type of the target subframe, specifically includes:

When at least the last symbol in the target subframe is determined to belong to an Uplink Pilot Time Slot (UpPTS), selecting the last symbol in the target subframe as the target symbol.

In the technical solution, if the target subframe is not an uplink subframe, the target subframe can be determined whether it is the UpPTS according to at least the last symbol in the target subframe, if the target subframe is determined to be the UpPTS, the last symbol in the target subframe can be selected as the target symbol.

In the above technical solution, preferably, the method further includes: determining whether a subframe that is located after the target subframe and is adjacent to the target subframe, is a first uplink subframe when a downlink subframe is converted into an uplink subframe, if a subframe that is located after the target subframe and is adjacent to the target subframe, is a first uplink subframe when a downlink subframe is converted into an uplink subframe, determining that at least the last symbol in the target subframe belongs to the UpPTS.

Solution 3:

In the above technical solution, preferably, selecting a target symbol in the target subframe for sending the SRS according to the type of the target subframe, specifically includes: when it is determined that the target subframe is not configured to be any subframe, selecting the last symbol in the target subframe as the target symbol.

In the technical solution, if the target subframe is not configured to be any subframe, that is, it is not determined that whether the target subframe is an uplink subframe, a downlink subframe or a special subframe, then the last symbol in the target subframe can be selected as the target symbol. Preferably, the last symbol in the target subframe may be selected as the target symbol at least when the last symbol in the target subframe has not been determined as being used for downlink.

Solution 4:

In the above technical solution, preferably, selecting a target symbol in the target subframe for sending the SRS according to the type of the target subframe, specifically includes:

When the target subframe is in a discovery reference signal (DRS) measurement timing configuration (DMTC) and the target subframe is not the 0 subframe (hereinafter referred to as "#0") and the 5 subframe (hereinafter referred to subframe "#5") in the frame structure 3, determining whether a primary synchronization signal (PSS) and a secondary synchronization signal (SSS) are detected in the target subframe;

When it is determined that the PSS and the SSS are not detected in the target subframe, or determined that the SSS and the PSS are detected before the eighth symbol and the ninth symbol respectively in the target subframe, selecting the last symbol in the target subframe as the target symbol.

In the technical solution, since the DRS occupies 12 symbols, it is possible for the 1st to the 12th symbols, the 2nd to the 13th symbols, or the 3rd to the 14th symbols in one subframe to be occupied. It is only when the DRS occupies the 3rd to the 14th symbols, that the last symbol in the subframe is used for sending the DRS, and in this case, the SSS and the PSS are respectively located in the 8th symbol and the 9th symbol in the subframe. Therefore, when the SSS and the PSS are respectively prior to the 8th symbol and the 9th symbol of the target subframe, the last symbol is not used for sending the DRS, thus it can be selected as the target symbol for sending the SRS. Meanwhile, if the target subframe is the subframe #0 or the subframe #5, the DRS may be transmitted simultaneously with the Physical Downlink Shared Channel (PDSCH). In this case, the last subframe may also be occupied by the PDSCH and cannot be used for sending the SRS, therefore the situation is required to be excluded.

Solution 5:

In the above technical solution, preferably, selecting a target symbol in the target subframe for sending the SRS, according to the type of the target subframe, specifically includes:

When it is determined that the target subframe is a downlink subframe, determining whether configuration information sent by the base station is received, the configuration information indicating that the base station configures the target subframe as a last subframe of a downlink transmission and uses a partial subframe structure, and indicating a number of symbols occupied by the target subframe;

When it is determined that the configuration information is received, selecting the last symbol in the target subframe as the target symbol.

In the technical solution, if the target subframe is a downlink subframe, in order to ensure that the SRS can be transmitted, the base station can configure the target subframe to be the last subframe of the downlink transmission and use the partial subframe structure, and indicating the number of the symbols occupied by the target subframe, then the terminal can determine that the last symbol indicating the subframe cannot be used for the downlink transmission, and can be used as the target symbol for sending the SRS.

In the solution 5, as the downlink transmission of the base station is not completed, after the terminal sends the SRS through the target symbol, the base station does not perform a channel detection and continues to transmit downlink data, or continues to transmit the downlink data at least after the channel of 34 us is detected to be idle.

In any of the above technical solutions, preferably, the step of sending the SRS through the target symbol, specifically includes: sending the SRS directly through the target symbol without channel detection; or At least performing a channel detection process for 16 us+M*9 us, and when the channel is detected to be idle, sending the SRS through the target symbol, M being 1 or 2.

In any one of the technical solutions, preferably, the method further includes:

Receiving a Radio Resource Control (RRC) configuration signaling sent by the base station, determining a location of the target subframe according to a sending period and an initial sending position of the SRS in the RRC configuration signaling; and/or Receiving a DCI configuration signaling sent by the base station, and determining the location of the target subframe according to the DCI configuration signaling.

In the technical solution, when the terminal determines the location of the target subframe, if the SRS is periodically sent, the location of the target subframe may be determined according to the sending period and the initial sending position of the SRS in the RRC configuration signaling sent by the base station; or for non-periodic SRS transmission, the terminal can determine the position of the target subframe according to the DCI configuration signaling sent by the base station.

According to a second aspect of the disclosure, the disclosure further provides a SRS sending device when a LTE system works with a frame structure 3 in an unlicensed frequency band, and includes: a determination unit configured to determine a type of a target subframe to send a SRS; a selection unit configured to select a target symbol in the target subframe for sending the SRS according to the type of the target subframe; a sending unit configured to send the SRS through the target symbol.

In the technical solution, by selecting the target symbol in the target subframe for sending the SRS according to the type of the target subframe, it is possible to select an appropriate symbol in the target subframe for sending the SRS according to the type of the target subframe that may be used for sending the SRS, and then when the LTE system works in an unlicensed frequency band, a normal transmission of the SRS can be ensured, thereby ensuring the measurement accuracy of the uplink channel quality, and improving the uplink throughput of the LTE system.

A solution for selecting the target symbol in the target subframe for sending the SRS mainly includes the following:

Solution 1:

In the above technical solution, preferably, the selection unit specifically configured to select a last symbol in the target subframe as the target symbol when the determination unit determines that the target subframe is an uplink subframe.

In the technical solution, if the target subframe is just an uplink subframe, the SRS can be sent at the last symbol in the uplink subframe.

In the above technical solution, preferably, the determination unit specifically configured to:

Receive a high layer signaling and/or a downlink control information (DCI) signaling sent by a base station for indicating an uplink subframe configuration, and determine whether the target subframe is an uplink subframe according to the high layer signaling and/or the DCI signaling; or Receive an uplink scheduling instruction sent by the base station, and determine whether the target subframe is an uplink subframe according to an indication of the uplink scheduling instruction.

Specifically, in one embodiment of the present disclosure, the base station can explicitly notify the terminal of a configuration situation of the uplink subframe through the high layer signaling and/or the DCI signaling, and then the terminal can determine whether the target subframe is an uplink subframe according to the high layer signaling and/or the DCI signaling. In another embodiment of the present disclosure, when the base station sends the uplink scheduling instruction (UL grant) to the terminal, the base station can notify the terminal to send uplink data at a corresponding subframe position, that is, the terminal is notified which subframes is a uplink subframes, then the terminal can determine whether the target subframe is an uplink subframe accordingly.

Solution 2:

In the above technical solution, preferably, the selection unit specifically configured to: select the last symbol in the target subframe as the target symbol when the determination unit determines that at least the last symbol in the target subframe belongs to an Uplink Pilot Time Slot (UpPTS).

In the technical solution, if the target subframe is not an uplink subframe, the target subframe can be determined whether it is the UpPTS according to at least the last symbol in the target subframe, if the target subframe is determined to be the UpPTS, the last symbol in the target subframe can be selected as the target symbol.

In the above technical solution, preferably, the determination unit specifically configured to: determine whether a subframe that is located after the target subframe and is adjacent to the target subframe, is a first uplink subframe when a downlink subframe is converted into an uplink subframe, if a subframe that is located after the target subframe and is adjacent to the target subframe, is a first uplink subframe when a downlink subframe is converted into an uplink subframe, determine that at least the last symbol in the target subframe belongs to the UpPTS.

Solution 3:

In the above technical solution, preferably, the selection unit specifically configured to: select the last symbol in the target subframe as the target symbol, when the determine unit determines that the target subframe is not configured to be any subframe.

In the technical solution, if the target subframe is not configured to be any subframe, that is, it is not determined that whether the target subframe is an uplink subframe, a downlink subframe or a special subframe, then the last symbol in the target subframe can be selected as the target symbol. Preferably, the last symbol in the target subframe may be selected as the target symbol at least when the last symbol in the target subframe has not been determined as being used for downlink.

Solution 4:

In the above technical solution, preferably, the selection unit includes: a first judgment unit configured to determine whether a primary synchronization signal (PSS) and a secondary synchronization signal (SSS) are detected in the target subframe, when the determination unit determines that the target subframe is in a discovery reference signal (DRS) measurement timing configuration (DMTC) and the target subframe is not the 0 subframe (hereinafter referred to as "#0") and the 5 subframe (hereinafter referred to as subframe "#5") in the frame structure 3; a first execution unit configured to select the last symbol in the target subframe as the target symbol, when the first judgment unit determines that the PSS and the SSS are not detected in the target subframe, or determines that the SSS and the PSS are respectively detected before the eighth symbol and the ninth symbol in the target subframe.

In the technical solution, since the DRS occupies 12 symbols, it is possible for the 1st to the 12th symbols, the 2nd to the 13th symbols, or the 3rd to the 14th symbols in one subframe to be occupied. It is only when the DRS occupies the 3rd to the 14th symbols, that the last symbol in the subframe is used for sending the DRS, and in this case, the SSS and the PSS are respectively located in the 8th symbol and the 9th symbol in the subframe. Therefore, when the SSS and the PSS are respectively prior to the 8th symbol and the 9th symbol of the target subframe, the last symbol is not used for sending the DRS, thus it can be selected as the target symbol for sending the SRS. Meanwhile, if the target subframe is the subframe #0 or the subframe #5, the DRS may be transmitted simultaneously with the Physical Downlink Shared Channel (PDSCH). In this case, the last subframe may also be occupied by the PDSCH and cannot be used for sending the SRS, therefore the situation is required to be excluded.

Solution 5:

In the above technical solution, preferably, the selection unit includes: a second judgment unit configured to determine whether configuration information sent by the base station is received, when the determination unit determines that the target subframe is a downlink subframe, the configuration information indicating that the base station configures the target subframe as a last subframe of a downlink transmission and uses a partial subframe structure, and indicating a number of symbols occupied by the target subframe; a second execution unit configured to select the last symbol in the target subframe as the target symbol, when the second judgment unit determines that the configuration information is received.

In the technical solution, if the target subframe is a downlink subframe, in order to ensure that the SRS can be transmitted, the base station can configure the target subframe to be the last subframe of the downlink transmission and use the partial subframe structure, and indicating the number of the symbols occupied by the target subframe, then the terminal can determine that the last symbol indicating the subframe cannot be used for the downlink transmission, and can be used as the target symbol for sending the SRS.

In the solution 5, as the downlink transmission of the base station is not completed, after the terminal sends the SRS through the target symbol, the base station does not perform a channel detection and continues to transmit downlink data, or continues to transmit the downlink data at least after the channel of 34 us is detected to be idle.

In any of the above technical solutions, preferably, the sending unit specifically configured to: send the SRS directly through the target symbol without channel detection; or At least perform a channel detection process for 16 us+M*9 us, and when the channel is detected to be idle, send the SRS through the target symbol, M being 1 or 2.

In any one of the technical solutions, preferably, the determination unit further configured to: receive a Radio Resource Control (RRC) configuration signaling sent by the base station, determine a location of the target subframe according to a sending period and an initial sending position of the SRS in the RRC configuration signaling; and/or Receive a DCI configuration signaling sent by the base station, and determine the location of the target subframe according to the DCI configuration signaling.

In the technical solution, when the terminal determines the location of the target subframe, if the SRS is periodically sent, the location of the target subframe may be determined according to the sending period and the initial sending position of the SRS in the RRC configuration signaling sent by the base station; or for non-periodic SRS transmission, the terminal can determine the position of the target subframe according to the DCI configuration signaling sent by the base station.

According to a third aspect of the disclosure, the disclosure further provides a terminal, which includes: a SRS sending device when a LTE system works with a frame structure 3 in an unlicensed frequency band as described in any one of the above technical solutions.

According to the above technical solution, when the LTE system works in an unlicensed frequency band, a normal transmission of the SRS can be ensured, thereby ensuring the measurement accuracy of the uplink channel quality, and improving the uplink throughput of the LTE system.

DETAILED DESCRIPTION

In order to more clearly understand the above purposes, features and advantages of the present disclosure, the present disclosure will further described in detail below with reference to the drawings and the specific embodiments. It should be noted that, in case of no conflict, the embodiments of the present application and the features in the embodiments can be combined with each other.

In the following description, many specific details are set forth order to provide a thorough understanding of the disclosure, however, the present disclosure may also be implemented in other ways other than those described here, therefore, the protection scope of the present disclosure is not to be limited by the specific embodiments herein disclosed.

Figure 1:
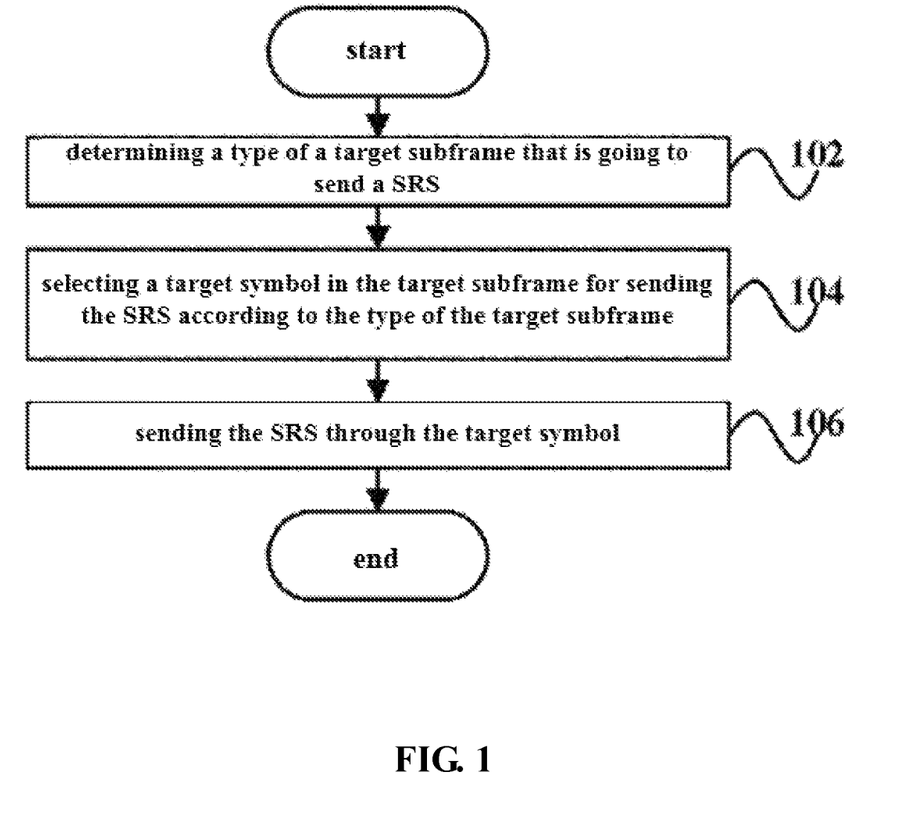
FIG. 1 shows a schematic flow diagram of a SRS transmission method when a LTE system works in an unlicensed frequency band with a frame structure 3 according to an embodiment of the present disclosure.

FIG. 1 shows a schematic flow diagram of a SRS transmission method when a Long Term Evolution (LTE) system works in an unlicensed frequency band with a frame structure 3 according to an embodiment of the present disclosure.

As shown in FIG. 1, according to an embodiment of the present disclosure, a Sounding Reference Signal (SRS) sending method when a LTE system works with a frame structure 3 in an unlicensed frequency band according to an embodiment of the present disclosure, includes:

Step S102, determining a type of a target subframe that is going to send a SRS;

Step S104, selecting a target symbol in the target subframe for sending the SRS according to the type of the target subframe;

Step S106, sending the SRS through the target symbol.

In the technical solution, by selecting the target symbol in the target subframe for sending the SRS according to the type of the target subframe, it is possible to select an appropriate symbol in the target subframe for sending the SRS according to the type of the target subframe that may be used for sending the SRS, and then when the LTE system works in an unlicensed frequency band, a normal transmission of the SRS can be ensured, thereby ensuring the measurement accuracy of the uplink channel quality, and improving the uplink throughput of the LTE system.

A solution for selecting the target symbol in the target subframe for sending the SRS mainly includes the following:

Solution 1:

In the above technical solution, preferably, selecting the target symbol in the target subframe for sending the SRS according to the type of the target subframe, specifically includes: when the target subframe is determined to be an uplink subframe, selecting a last symbol in the target subframe as the target symbol.

In the technical solution, if the target subframe is just an uplink subframe, the SRS can be sent at the last symbol in the uplink subframe.

In the above technical solution, preferably, the method further includes: receiving a high layer signaling and/or a downlink control information (DCI) signaling sent by a base station for indicating an uplink subframe configuration, and determining whether the target subframe is an uplink subframe according to the high layer signaling and/or the DCI signaling; or Receiving an uplink scheduling instruction sent by the base station, and determining whether the target subframe is an uplink subframe according to an indication of the uplink scheduling instruction.

Specifically, in one embodiment of the present disclosure, the base station can explicitly notify the terminal of a configuration situation of the uplink subframe through the high layer signaling and/or the DCI signaling, and then the terminal can determine whether the target subframe is an uplink subframe according to the high layer signaling and/or the DCI signaling. In another embodiment of the present disclosure, when the base station sends the uplink scheduling instruction (UL grant) to the terminal, the base station can notify the terminal to send uplink data at a corresponding subframe position, that is, the terminal is notified which subframe is an uplink subframe, then the terminal can determine whether the target subframe is an uplink subframe accordingly.

Solution 2:

In the above technical solution, preferably, selecting a target symbol in the target subframe for sending the SRS according to the type of the target subframe, specifically includes:

When at least the last symbol in the target subframe is determined to belong to an Uplink Pilot Time Slot (UpPTS), selecting the last symbol in the target subframe as the target symbol.

In the technical solution, if the target subframe is not an uplink subframe, the target subframe can be determined whether it is the UpPTS according to at least the last symbol in the target subframe, if the target subframe is determined to be the UpPTS, the last symbol in the target subframe can be selected as the target symbol.

In the above technical solution, preferably, the method further includes: determining whether a subframe that is located after the target subframe and is adjacent to the target subframe, is a first uplink subframe when a downlink subframe is converted into an uplink subframe, if a subframe that is located after the target subframe and is adjacent to the target subframe, is a first uplink subframe when a downlink subframe is converted into an uplink subframe, determining that at least the last symbol in the target subframe belongs to the UpPTS.

Solution 3:

In the above technical solution, preferably, selecting a target symbol in the target subframe for sending the SRS according to the type of the target subframe, specifically includes: when it is determined that the target subframe is not configured to be any subframe, selecting the last symbol in the target subframe as the target symbol.

In the technical solution, if the target subframe is not configured to be any subframe, that is, it is not determined that whether the target subframe is an uplink subframe, a downlink subframe or a special subframe, then the last one of the target subframe can be selected as the target symbol. Preferably, the last symbol in the target subframe may be selected as the target symbol at least when the last symbol in the target subframe has not been determined as being used for downlink.

Solution 4:

In the above technical solution, preferably, selecting a target symbol in the target subframe for sending the SRS according to the type of the target subframe, specifically includes:

When the target subframe is in a discovery reference signal (DRS) measurement timing configuration (DMTC) and the target subframe is not the 0 subframe (hereinafter referred to as "#0") and the 5 subframe (hereinafter referred to subframe "#5") in the frame structure 3, determining whether a primary synchronization signal (PSS) and a secondary synchronization signal (SSS) are detected in the target subframe;

When it is determined that the PSS and the SSS are not detected in the target subframe, or determined that the SSS and the PSS are detected before the eighth symbol and the ninth symbol respectively in the target subframe, selecting the last symbol in the target subframe as the target symbol.

In the technical solution, since the DRS occupies 12 symbols, it is possible for occupy the 1st to the 12th symbols, the 2nd to the 13th symbols, or the 3rd to the 14th symbols in one subframe to be occupied. It is only when the DRS occupies the 3rd to the 14th symbols, that the last symbol in the subframe is used for sending the DRS, and in this case, the SSS and the PSS are respectively located in the 8th symbol and the 9th symbol in the subframe. Therefore, when the SSS and the PSS are respectively prior to the 8th symbol and the 9th symbol of the target subframe, the last symbol is not used for sending the DRS, thus it can be selected as the target symbol for sending the SRS. Meanwhile, if the target subframe is the subframe #0 or the subframe #5, the DRS may be transmitted simultaneously with the Physical Downlink Shared Channel (PDSCH). In this case, the last subframe may also be occupied by the PDSCH and cannot be used for sending the SRS, therefore the situation is required to be excluded.

Solution 5:

In the above technical solution, preferably, selecting a target symbol in the target subframe for sending the SRS according to the type of the target subframe, specifically includes:

When it is determined that the target subframe is a downlink subframe, determining whether configuration information sent by the base station is received, the configuration information indicating that the base station configures the target subframe as a last subframe of a downlink transmission and uses a partial subframe structure, and indicating a number of symbols occupied by the target subframe;

When it is determined that the configuration information is received, selecting the last symbol in the target subframe as the target symbol.

In the technical solution, if the target subframe is a downlink subframe, in order to ensure that the SRS can be transmitted, the base station can configure the target subframe to be the last subframe of the downlink transmission and use the partial subframe structure, and indicating the number of the symbols occupied by the target subframe, then the terminal can determine that the last symbol indicating the subframe cannot be used for the downlink transmission, and can be used as the target symbol for sending the SRS.

In the solution 5, as the downlink transmission of the base station is not completed, after the terminal sends the SRS through the target symbol, the base station
does not perform a channel detection and continues to transmit downlink data, or continues to transmit the downlink data at least after the channel of 34 us is detected to be idle.

In any of the above technical solutions, preferably, the step of sending the SRS through the target symbol, specifically includes: sending the SRS directly through the target symbol without channel detection; or At least performing a channel detection process for 16 us+M*9 us, and when the channel is detected to be idle, sending the SRS through the target symbol, M being 1 or 2.

In any one of the technical solutions, preferably, the method further includes:

Receiving a Radio Resource Control (RRC) configuration signaling sent by the base station, determining a location of the target subframe according to a sending period and an initial sending position of the SRS in the RRC configuration signaling; and/or Receiving a DCI configuration signaling sent by the base station, and determining the location of the target subframe according to the DCI configuration signaling.

In the technical solution, when the terminal determines the location of the target subframe, if the SRS is periodically sent, the location of the target subframe may be determined according to the sending period and the initial sending position of the SRS in the RRC configuration signaling sent by the base station; or for non-periodic SRS transmission, the terminal can determine the position of the target subframe according to the DCI configuration signaling sent by the base station.

Figure 2:
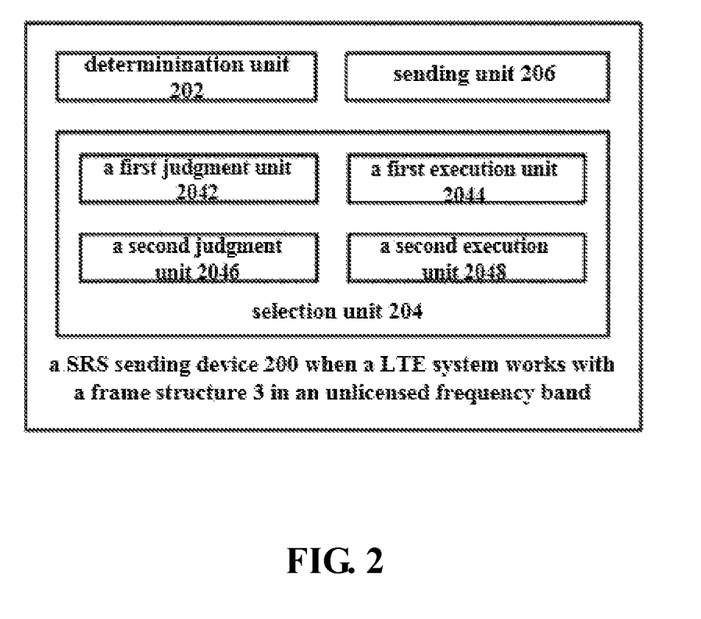
FIG. 2 shows a schematic block diagram of a SRS transmission device when a LTE system works in an unlicensed frequency band with a frame structure 3 according to an embodiment of the present disclosure.

FIG. 2 shows a schematic block diagram of a SRS transmission device when a LTE system works in an unlicensed frequency band with a frame structure 3 according to an embodiment of the present disclosure.

As shown in FIG. 2, according to an embodiment of the present disclosure, a SRS sending device when a LTE system works with a frame structure 3 in an unlicensed frequency band includes: a determination unit 202, a selection unit 204 and a sending unit.

The determination unit 202 is configured to determine a type of a target subframe that is going to send a SRS;

The selection unit 204 is configured to select a target symbol in the target subframe for sending the SRS according to the type of the target subframe;

The sending unit 206 is configured to select the SRS through the target symbol.

In the technical solution, by selecting the target symbol in the target subframe for sending the SRS according to the type of the target subframe, it is possible to select an appropriate symbol in the target subframe for sending the SRS according to the type of the target subframe that may be used for sending the SRS, and then when the LTE system works in an unlicensed frequency band, a normal transmission of the SRS can be ensured, thereby ensuring the measurement accuracy of the uplink channel quality, and improving the uplink throughput of the LTE system.

A solution for selecting the target symbol in the target subframe for sending the SRS mainly includes the following:

Solution 1:

In the above technical solution, preferably, the selection unit 204 is specifically configured to select a last symbol in the target subframe as the target symbol, when the determination unit 202 determines that the target subframe is an uplink subframe.

In the technical solution, if the target subframe is just an uplink subframe, the SRS can be sent at the last symbol in the uplink subframe.

In the above technical solution, preferably, the determination unit 202 is specifically configured to:

Receive a high layer signaling and/or a downlink control information (DCI) signaling sent by a base station and used for indicating an uplink subframe configuration, and determine whether the target subframe is an uplink subframe according to the high layer signaling and/or the DCI signaling; or Receive an uplink scheduling instruction sent by the base station, and determine whether the target subframe is an uplink subframe according to an indication of the uplink scheduling instruction.

Specifically, in one embodiment of the present disclosure, the base station can explicitly notify the terminal of a configuration situation of the uplink subframe through the high layer signaling and/or the DCI signaling, and then the terminal can determine whether the target subframe is an uplink subframe according to the high layer signaling and/or the DCI signaling. In another embodiment of the present disclosure, when the base station sends the uplink scheduling instruction (UL grant) to the terminal, the base station can notify the terminal to send uplink data at a corresponding subframe position, that is, the terminal is notified which subframe is an uplink subframe, then the terminal can determine whether the target subframe is an uplink subframe accordingly.

Solution 2:

In the above technical solution, preferably, the selection unit 204 is specifically configured to: select the last symbol in the target subframe as the target symbol, when the determination unit 202 determines that at least the last symbol in the target subframe belongs to an Uplink Pilot Time Slot (UpPTS).

In the technical solution, if the target subframe is not an uplink subframe, the target subframe can be determined whether it is the UpPTS according to at least the last symbol in the target subframe, if the target subframe is determined to be the UpPTS, the last symbol in the target subframe can be selected as the target symbol.

In the above technical solution, preferably, the determination unit specifically configured to: determine whether a subframe that is located after the target subframe, and is adjacent to the target subframe, is a first uplink subframe when a downlink subframe is converted into an uplink subframe, if a subframe that is located after the target subframe and is adjacent to the target subframe, is a first uplink subframe when a downlink subframe is converted into an uplink subframe, determine that at least the last symbol in the target subframe belongs to the UpPTS.

Solution 3:

In the above technical solution, preferably, the selection unit 204 is specifically configured to: select the last symbol in the target subframe as the target symbol, when the determine unit 202 determines that the target subframe is not configured to be any subframe.

In the technical solution, if the target subframe is not configured to be any subframe, that is, it is not determined that whether the target subframe is an uplink subframe, a downlink subframe or a special subframe, then the last symbol in the target subframe can be selected as the target symbol. Preferably, the last symbol in the target subframe may be selected as the target symbol at least when the last symbol in the target subframe has not been determined as being used for downlink.

Solution 4:

In the above technical solution, preferably, the selection unit 204 includes: a first judgment unit 2042 configured to determine whether a primary synchronization signal (PSS) and a secondary synchronization signal (SSS) are detected in the target subframe, when the determining unit 202 determines that the target subframe is in a discovery reference signal (DRS) measurement timing configuration (DMTC) and the target subframe is not the 0 subframe and the 5 subframe in the frame structure 3; a first execution unit 2044 configured to select the last symbol in the target subframe as the target symbol, when the first judging unit 2042 determines that the PSS and the SSS are not detected in the target subframe, or determined that the SSS and the PSS are respectively detected before the eighth symbol and the ninth symbol in the target subframe.

In the technical solution, since the DRS occupies 12 symbols, it is possible for the 1st to the 12th symbols, the 2nd to the 13th symbols, or the 3rd to the 14th symbols in one subframe to be occupied. It is only when the DRS occupies the 3rd to the 14th symbols, that the last symbol in the subframe is used for sending the DRS, and in this case, the SSS and the PSS are respectively located in the 8th symbol and the 9th symbol in the subframe. Therefore, when the SSS and the PSS are respectively prior to the 8th symbol and the 9th symbol of the target subframe, the last symbol is not used for sending the DRS, thus it can be selected as the target symbol for sending the SRS. Meanwhile, if the target subframe is the subframe #0 or the subframe #5, the DRS may be transmitted simultaneously with the Physical Downlink Shared Channel (PDSCH). In this case, the last subframe may also be occupied by the PDSCH and cannot be used for sending the SRS, therefore the situation is required to be excluded.

Solution 5:

In the above technical solution, preferably, the selection unit 204 includes: a second judgment unit 2046, configured to determine whether configuration information sent by the base station is received, when the determination unit 202 determines that the target subframe is a downlink subframe, the configuration information indicating that the base station configures the target subframe as a last subframe of a downlink transmission and uses a partial subframe structure, and indicating a number of symbols occupied by the target subframe; a second execution unit 2048, configured to select the last symbol in the target subframe as the target symbol, when the second judgment unit 2046 determines that the configuration information is received.

In the technical solution, if the target subframe is a downlink subframe, in order to ensure that the SRS can be transmitted, the base station can configure the target subframe to be the last subframe of the downlink transmission and use the partial subframe structure, and indicating the number of the symbols occupied by the target subframe, then the terminal can determine that the last symbol indicating the subframe cannot be used for the downlink transmission, and can be used as the target symbol for sending the SRS.

In the solution 5, as the downlink transmission of the base station is not completed, after the terminal sends the SRS through the target symbol, the base station does not perform a channel detection and continues to transmit downlink data, or continues to transmit the downlink data at least after the channel of 34 us is detected to be idle.

In any of the above technical solutions, preferably, the sending unit 206 is specifically configured to: send the SRS directly through the target symbol without channel detection; or At least perform a channel detection process for 16 us+M*9 us, and when the channel is detected to be idle, send the SRS through the target symbol, M being 1 or 2.

In any one of the technical solutions, preferably, the determination unit 202 is further configured to: receive a Radio Resource Control (RRC) configuration signaling sent by the base station, determine a location of the target subframe according to a sending period and an initial sending position of the SRS in the RRC configuration signaling; and/or Receive a DCI configuration signaling sent by the base station, and determine the location of the target subframe according to the DCI configuration signaling.

In the technical solution, when the terminal determines the location of the target subframe, if the SRS is periodically sent, the location of the target subframe may be determined according to the sending period and the initial sending position of the SRS in the RRC configuration signaling sent by the base station; or for non-periodic SRS transmission, the terminal can determine the position of the target subframe according to the DCI configuration signaling sent by the base station.

Figure 3:
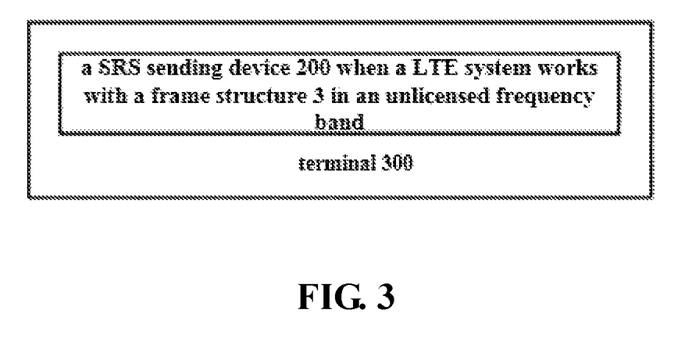
FIG. 3 shows a schematic block diagram of a terminal according to an embodiment of the present disclosure.

FIG. 3 shows a schematic block diagram of a terminal according to an embodiment of the present disclosure.

As shown in FIG. 3, according to an embodiment of the present disclosure, a terminal 300 includes: a SRS sending device 200 when a LTE system works with a frame structure 3 in an unlicensed frequency band as shown in FIG. 2.

In summary, the technical solution of the present disclosure is mainly to provide a configuration method for SRS sending subframe when a LTE system works with a frame structure 3, in the case of dynamic uplink and downlink subframe changes, performing reasonable configuration for periodic SRS transmission and non-periodic SRS transmission respectively, thereby ensuring the SRS can be sent normally, ensuring the measurement accuracy of the uplink channel quality, and improving the uplink throughput.

The following describes the periodic SRS transmission and non-periodic SRS transmission respectively:

For periodic SRS transmission instructions are as follows:

1, A user equipment (UE) receives a high layer signaling sent by a base station, such as a RRC signaling, which configures the SRS to be periodically transmitted.

2, As long as a subframe that is sent by a periodically configured SRS is not configured to be a downlink subframe, the UE may send the SRS at the last symbol, specifically includes the following situations:

(1) The UE determines that a subframe, which is sent by a periodically configured SRS is originally configured to be a uplink subframe, and sends on the last symbol.

A method for determining whether it is an uplink subframe includes: indicating that the subframe is the uplink subframe when a high layer signaling and/or the DCI signaling indicating the configuration of the uplink subframe are received; or indicating that the subframe is the uplink subframe when the UL grant sent by the base station is received.

(2) If the UE determines that the symbol is UpPTS according to at least the last symbol of the periodically configured SRS transmission subframe, the SRS can be sent on the last symbol.

The method for determining whether the symbol is UpPTS according to at least the last symbol of the periodically configured SRS transmission subframe includes: when the subframe is located before a first uplink subframe when a downlink subframe is converted into an uplink subframe, indicating that at least the last symbol of the subframe is an UpPTS.

(3) If the UE determines that the periodically configured SRS transmission subframe is not configured to be any subframe, that is, it is not determined that whether the target subframe is an uplink subframe, a downlink subframe or a special subframe, or at least the last symbol has not determined as being used for downlinking, the SRS can be sent in the last symbol of the subframe. This situation may be that the base station is performing a downlink channel detection.

(4) The above three items are all that the UE determines that the periodically configured SRS transmission subframe is not in discovery reference signal (DRS) measurement timing configuration (DMTC). When the subframe is in the DMTC, that is, the transmittable position of the DRS, the UE can send the SRS when it determines that the last symbol of the subframe is not used to transmit the DRS.

The method for determining whether the periodically configured SRS transmission subframe is not in discovery reference signal (DRS) measurement timing tonfiguration (DMTC) includes: a PSS/SSS not being detected in the subframe (indicating that DRS will not be sent); or a PSS/SSS being detected in the subframe, but a SSS and a PSS are detected in symbol 5 (that is the 6th symbol of the subframe) and symbol 6 (that is the 7th symbol of the subframe) of the subframe respectively, or a SSS and a PSS are detected in symbol 6 (that is the 7th symbol of the subframe) and symbol 7 (that is the 8th symbol of the subframe) of the subframe respectively, it is indicated that the SRS can be sent through the last symbol of the subframe.

The basis for the above determination is that since the existing standard specifies that the DRS occupies 12 symbols, it is possible to occupy the #0 to the #11 symbols, the #1 to the #12 symbols, or the #2 to the #13 symbols in a subframe. It is only when the DRS occupies the #2 to the #13 symbols that the last symbol in the subframe is used for sending the DRS, and in this case, the SSS and the PSS are respectively located in the #7 symbol and the #8 symbol in the subframe. Therefore, when the SSS and the PSS are respectively before the #7 symbol and the #8 symbol, the last symbol is not used for sending the DRS.

3, When the periodically configured SRS transmission subframe has been dynamic configured to be a downlink subframe, in order to send SRS, including a following method:

Even if the maximum channel occupancy time is not elapsed, the base station also configures the downlink subframe as the last subframe in a downlink transmission burst, and the subframe uses a partial subframe structure, for example, a structure that occupies 12 symbols of Downlink Pilot Time Slot (DwPTS) is used. At the same time, a DCI signaling indicates a number of symbols occupied by the subframe. Then, the UE listens to the DCI signaling, and can determine that the last symbol of the subframe is not used for downlink transmission, thus it can be used for sending a SRS.

It should be noted that, in this solution, since the maximum channel occupancy time has not yet been elapsed, and the downlink transmission empties the last symbol to send the SRS, thus the downlink transmission is interrupted, then the LBT mechanism of the base station may be any of the following before a next subframe is occupied by the downlink.

(1) It is no need to perform a LBT detection, sending directly;

(2) At least the channel of 34 us is detected to be idle.

4, The LBT mechanism of SRS mainly has the following two types:

(1) It is no need to perform the LBT detection. For example, the interval between the SRS transmission of this symbol and the end time of the downlink transmission of the base station is shorter than 25 us.

(2) At least performing a channel detection process for 16 us+M*9 us, and sending the SRS when the channel is detected to be idle, M being 1 or 2.

For non-periodic SRS transmission instructions are described as follows:

In a traditional non-periodic SRS transmission method, the non-periodic SRS configuration signaling also needs the base station to indicate the transmittable subframe position of the non-periodic SRS. In addition, the base station needs to use the DCI signaling to send SRS request in the subframe to trigger the most recent subframe of the UE in subframe n+k (k is larger than or equal to 4) and which belongs to a subframe, which can send the SRS that is given in the configuration signaling;

In the method for transmitting non-periodic SRS provided by the present disclosure, for subframes satisfying k>=4, if a subframe is a transmittable subframe of the non-periodic SRS, the SRS may be sent according to the sending method provided in the method for periodically sending the SRS; the LBT mechanism provided in the method for periodically sending the SRS is also applicable to non-periodic SRS transmission.

Specifically:

1, As long as a subframe that is sent by a SRS configured by a base station is not configured as a downlink subframe, the UE may send the SRS at the last symbol, specifically includes the following situations:

(1) The UE determines that a subframe, which is sent by a SRS configured by a base station is originally configured to be a uplink subframe, and sends on the last symbol.

A method for determining whether it is an uplink subframe includes: indicating that the subframe is the uplink subframe when a high layer signaling and/or the DCI signaling indicating the configuration of the uplink subframe are received; or indicating that the subframe is the uplink subframe when the UL grant sent by the base station is received.

(2) If the UE determines that the symbol is UpPTS according to at least the last symbol of the SRS transmission subframe configured by the base station, the SRS can be sent on the last symbol.

The method for determining whether the symbol is UpPTS according to at least the last symbol of the periodically configured SRS transmission subframe includes: when the subframe is located before a first uplink subframe when a downlink subframe is converted into an uplink subframe, then indicating that at least the last symbol of the subframe is an UpPTS.

(3) If the UE determines that the SRS transmission subframe configured by the base station is not configured to be any subframe, that is, it is not determined that whether the target subframe is an uplink subframe, a downlink subframe or a special subframe, or at least the last symbol has not determined as being used for downlinking, the SRS can be sent in the last symbol of the subframe. This situation may be that the base station is performing a downlink channel detection.

(4) The above three items are all that the UE determines that the SRS transmission subframe configured by the base station is not in discovery reference signal (DRS) measurement timing configuration (DMTC). When the subframe is in the DMTC, that is, the transmittable position of the DRS, the UE can send the SRS when it determines that the last symbol of the subframe is not used to transmit the DRS.

The method for determining whether the periodically configured SRS transmission subframe is not in discovery reference signal (DRS) measurement timing tonfiguration (DMTC) includes: a PSS/SSS non being detected in the subframe (indicating that DRS will not be sent); or a PSS/SSS being detected in the subframe, but a SSS and a PSS are detected in symbol 5 (that is the 6th symbol of the subframe) and symbol 6 (that is the 7th symbol of the subframe) of the subframe respectively, or a SSS and a PSS are detected in symbol 6 (that is the 7th symbol of the subframe) and symbol 7 (that is the 8th symbol of the subframe) of the subframe respectively, it is indicated that the SRS can be sent through the last symbol of the subframe.

The basis for the above determination is that since the existing standard specifies that the DRS occupies 12 symbols, it is possible to occupy the #0 to the #11 symbols, the #1 to the #12 symbols, or the #2 to the #13 symbols in a subframe. It is only when the DRS occupies the #2 to the #13 symbols that the last symbol in the subframe is used for sending the DRS, and in this case, the SSS and the PSS are respectively located in the #7 symbol and the #8 # symbol in the subframe. Therefore, when the SSS and the PSS are respectively before the #7 symbol and the #8 symbol, the last symbol is not used for sending the DRS.

2, When the SRS transmission subframe configured by the base station has been dynamic configured to be a downlink subframe, in order to send SRS, including a following method:

Even if the maximum channel occupancy time is not elapsed, the base station also configures the downlink subframe as the last subframe in a downlink transmission burst, and the subframe uses a partial subframe structure, for example, using a structure that occupies 12 symbols of Downlink Pilot Time Slot (DwPTS) is used. At the same time, a DCI signaling indicates a number of symbols occupied by the subframe. Then, the UE listens to the DCI signaling, and can determine that the last symbol of the subframe is not used for downlink transmission, thus it can be used for sending a SRS.

It should be noted that, in this solution, since the maximum channel occupancy time has not yet been elapsed, and the downlink transmission empties the last symbol to send the SRS, thus the downlink transmission is interrupted, then the LBT mechanism of the base station may be any of the following before a next subframe is occupied by the downlink.

(1) It is no need to perform a LBT detection, sending directly;

(2) At least the channel of 34 us is detected to be idle.

3, The LBT mechanism of SRS mainly has the following two types:

(1) It is no need to perform the LBT detection. For example, the interval between the SRS transmission of this symbol and the end time of the downlink transmission of the base station is shorter than 25 us.

(2) At least performing a channel detection process for 16 us+M*9 us, and sending the SRS when the channel is detected to be idle, M being 1 or 2.

The above technical solution of the present disclosure provides solutions for periodic and non-periodic SRS transmissions for the TDD configuration of dynamic uplink and downlink changes, ensuring the transmission efficiency of SRS while ensuring downlink transmission, thus the uplink channel quality measurements more accurately, and improving the uplink throughput.

The technical solution of the present disclosure is described in detail with reference to the drawings, the present disclosure provides a new SRS transmission solution when a LTE system works in an unlicensed frequency band with a frame structure 3, thus, when the LTE system works in the unlicensed frequency band, normal transmission of the SRS can be ensured, measurement accuracy of uplink channel quality can be ensured, and uplink throughput of the LTE system can be improved.

The terminal 300 in the embodiment of the present disclosure may be different types of user electronic devices, for example, smart phones, tablets, personal digital assistants (PDAs) and mobile Internet devices, personal digital assistants, media players, smart televisions (TVs), smart watches, smart glasses, smart bracelets, etc.

Figure 4:
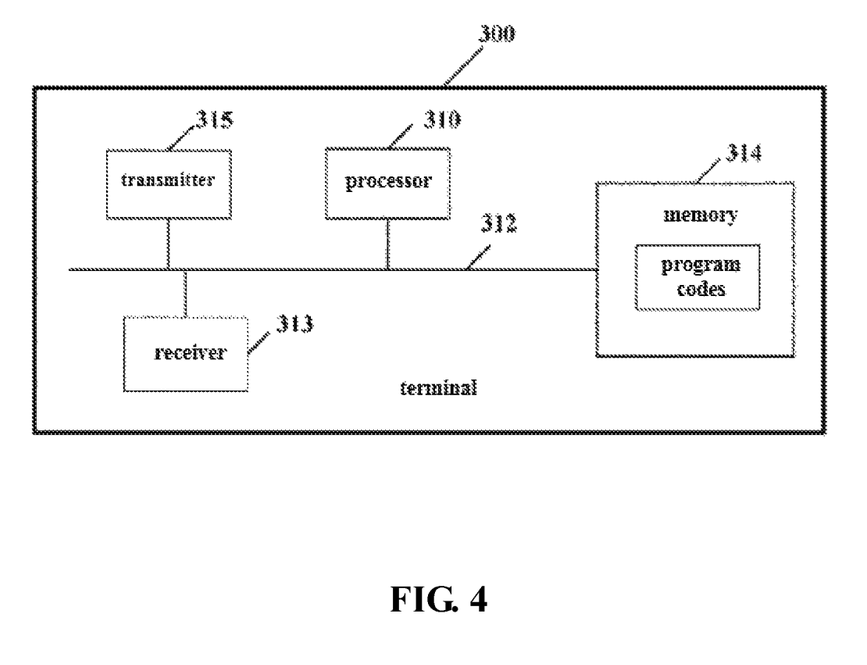
FIG. 4 shows a hardware structure diagram of a terminal disclosed in an embodiment of the present disclosure.

FIG. 4 shows a hardware structure diagram of a terminal disclosed in an embodiment of the present disclosure. As shown in FIG. 4, the terminal 300 in the embodiment of the present disclosure includes: at least one processor 310, such as a CPU, at least one receiver 313, at least one memory 314, at least one transmitter 315, at least one communication bus 312. The communication bus 312 is used to implement connection communication between these components. The receiver 313 and transmitter 315 may be wired transmission interfaces or wireless devices, for example including antenna devices for data communication with other devices. The memory may be a high speed RAM memory or a non-volatile memory such as at least one disk memory.

The processor 310 may execute an operating system of the terminal 300 and various installed applications, program codes, etc, for example, each unit described above, including the determination unit 202, the selection unit 204, and the sending unit, etc.

Program codes are stored in the memory 314, and the processor 310 can call program codes stored in the memory to perform related functions through the communication bus 312. For example, the various units described in FIG. 2 (such as the determination unit 202, the selection unit 204, and the sending unit, etc) are program codes stored in the memory 314 and executed by the processor 310 to implement the functions of the various units to enable transmission of the SRS.

In one embodiment of the disclosure, the memory 314 stores multiple instructions that are executed by the processor 310 to implement a method of sending the SRS. Specifically, the processor 310 determines a type of a target subframe that is going to send a SRS; selects a target symbol in the target subframe for sending the SRS according to the type of the target subframe; sends the SRS through the target symbol.

In a further embodiment, the processor 310 selects a target symbol in the target subframe for sending the SRS according to the type of the target subframe, specifically includes: selects a last symbol in the target subframe as the target symbol, when the target subframe is determined to be an uplink subframe.

In a further embodiment, the processor 310 receives a high layer signaling and/or a downlink control information (DCI) signaling sent by a base station for indicating an uplink subframe configuration, and determines whether the target subframe is an uplink subframe according to the high layer signaling and/or the DCI signaling; or receives an uplink scheduling instruction sent by the base station, and determines whether the target subframe is an uplink subframe according to an indication of the uplink scheduling instruction.

In a further embodiment, the processor 310 selects a target symbol in the target subframe for sending the SRS according to the type of the target subframe, specifically includes: selects the last symbol in the target subframe as the target symbol, when at least the last symbol in the target subframe is determined to belong to an Uplink Pilot Time Slot (UpPTS).

In a further embodiment, the processor 310 determines whether a subframe that is located after the target subframe and is adjacent to the target subframe, is a first uplink subframe when a downlink subframe is converted into an uplink subframe, if the target subframe is determined to be the UpPTS, determines that at least the last symbol in the target subframe belongs to the UpPTS.

In a further embodiment, the processor 310 selects a target symbol in the target subframe for sending the SRS according to the type of the target subframe, specifically includes: selects the last symbol in the target subframe as the target symbol, when it is determined that the target subframe is not configured to be any subframe.

In a further embodiment, the processor 310 selects a target symbol in the target subframe for sending the SRS according to the type of the target subframe, specifically includes: determines whether a PSS and a SSS are detected in the target subframe, when the target subframe is in a discovery reference signal (DRS) measurement timing configuration and the target subframe is not the 0 subframe and the 5 subframe in the frame structure 3; selects the last symbol in the target subframe as the target symbol, when it is determined that the PSS and the SSS are not detected in the target subframe, or determined that the SSS and the PSS are respectively detected before the eighth symbol and the ninth symbol in the target subframe.

In a further embodiment, the processor 310 selects a target symbol in the target subframe for sending the SRS according to the type of the target subframe, specifically includes: determines whether configuration information sent by the base station is received, when it is determined that the target subframe is a downlink subframe, the configuration information indicating that the base station configures the target subframe as a last subframe of a downlink transmission and uses a partial subframe structure, and indicating a number of symbols occupied by the target subframe; selects the last symbol in the target subframe as the target symbol, when it is determined that the configuration information is received.

In a further embodiment, after the terminal 300 sends the SRS through the target symbol, the base station does not perform a channel detection and continues to transmit downlink data, or continues to transmit the downlink data at least after the channel of 34 us is detected to be idle.

In a further embodiment, the step of the processor 310 sends the SRS through the target symbol, specifically includes: sends the SRS directly through the target symbol without channel detection; or at least performs a channel detection process for 16 us+M*9 us, and when the channel is detected to be idle, sends the SRS through the target symbol, M being 1 or 2.

In a further embodiment, the processor 310 receives a Radio Resource Control (RRC) configuration signaling sent by the base station, and determines a location of the target subframe according to a sending period and an initial sending position of the SRS in the RRC configuration signaling; and/or receives a DCI configuration signaling sent by the base station, and determines the location of the target subframe according to the DCI configuration signaling.

Specifically, specific implementation method of the processor 310 for the above instructions can reference the description of the relevant steps in the corresponding embodiment of FIG. 1, details not giving here.

The above description is only preferred embodiments of the present disclosure and is not intended to limit the present disclosure, the disclosure can have various changes and variations for technicians the field. Any modifications, equivalent substitutions, improvements, etc., made within the spirit and scope of the disclosure are intended to be included within the scope of the disclosure.

What is claimed is:

1. A Sounding Reference Signal (SRS) sending method when a Long Term Evolution (LTE) system works with a frame structure 3 in an unlicensed frequency band, comprising:

determining a type of a target subframe to send an SRS;
selecting a target symbol in the target subframe for sending the SRS according to the type of the target subframe, comprising:
in response that the target subframe is a downlink subframe, determining whether configuration information sent by a base station is received, the configuration information indicating that the base station configures the target subframe as a last subframe of a downlink transmission and uses a partial subframe structure, and indicating a number of symbols occupied by the target subframe; and
in response that the configuration information is received, selecting the last symbol in the target subframe as the target symbol;
sending the SRS through the target symbol.

2. The SRS sending method when the LTE system works with the frame structure 3 in the unlicensed frequency band of claim 1, wherein selecting the target symbol in the target subframe for sending the SRS according to the type of the target subframe comprises:
in response that the target subframe is an uplink subframe, selecting a last symbol in the target subframe as the target symbol.

3. The SRS sending method when the LTE system works with the frame structure 3 in an unlicensed frequency band of claim 2, further comprising:
receiving a high layer signaling or a downlink control information (DCI) signaling sent by the base station for indicating an uplink subframe configuration, and determining whether the target subframe is an uplink subframe according to the high layer signaling or the DCI signaling; or
receiving an uplink scheduling instruction sent by the base station, and determining whether the target subframe is an uplink subframe according to an indication of the uplink scheduling instruction.

4. The SRS sending method when the LTE system works with the frame structure 3 in an unlicensed frequency band of claim 1, wherein selecting the target symbol in the target subframe for sending the SRS according to the type of the target subframe comprises:
in response that at least the last symbol in the target subframe belongs to an Uplink Pilot Time Slot (UpPTS), selecting the last symbol in the target subframe as the target symbol.

5. The SRS sending method when the LTE system works with the frame structure 3 in an unlicensed frequency band of claim 4, further comprising:
determining whether a subframe that is located after the target subframe and is adjacent to the target subframe, is a first uplink subframe when a downlink subframe is converted into an uplink subframe;
in response that the subframe that is located after the target subframe and is adjacent to the target subframe, is the first uplink subframe when the downlink subframe is converted into the uplink subframe, determining that at least the last symbol in the target subframe belongs to the UpPTS.

6. The SRS sending method when the LTE system works with the frame structure 3 in an unlicensed frequency band of claim 1, wherein selecting the target symbol in the target subframe for sending the SRS according to the type of the target subframe comprises:

in response that the target subframe is not configured to be any subframe, selecting the last symbol in the target subframe to be the target symbol.

7. The SRS sending method when the LTE system works with the frame structure 3 in an unlicensed frequency band of claim 1, wherein selecting the target symbol in the target subframe for sending the SRS according to the type of the target subframe comprises:

in response that the target subframe is in a discovery reference signal (DRS) measurement timing configuration and the target subframe is not a 0 subframe and a 5 subframe in the frame structure 3, determining whether a primary synchronization signal (PSS) and a secondary synchronization signal (SSS) are detected in the target subframe;

in response that the PSS and the SSS are not detected in the target subframe or the SSS and the PSS are respectively detected before the eighth symbol and the ninth symbol in the target subframe, selecting the last symbol in the target subframe as the target symbol.

8. The SRS sending method when the LTE system works with the frame structure 3 in an unlicensed frequency band of claim 1, wherein:

after sending the SRS through the target symbol, the base station continues to transmit downlink data without performing a channel detection, or continues to transmit the downlink data at least after the channel of 34 us is detected to be idle.

9. The SRS sending method when the LTE system works with the frame structure 3 in an unlicensed frequency band of claim 1, wherein sending the SRS through the target symbol comprises:

sending the SRS directly through the target symbol without a channel detection; or at least performing a channel detection process for 16 us+M*9 us, and sending the SRS through the target symbol when the channel is detected to be idle, M being 1 or 2.

10. The SRS sending method when the LTE system works with the frame structure 3 in an unlicensed frequency band of claim 1, further comprising:

receiving a RRC configuration signaling sent by the base station, determining a location of the target subframe according to a sending period and an initial sending position of the SRS in the RRC configuration signaling; or receiving a DCI configuration signaling sent by the base station, and determining the location of the target subframe according to the DCI configuration signaling.

11. A terminal, comprising:
at least one processor; and
a storage device storing a plurality of instructions, which when executed by the processor, causes the at least one processor to:
determine a type of a target subframe that is going to send a SRS;
select a target symbol in the target subframe for sending the SRS according to the type of the target subframe, comprising:

in response that the target subframe is a downlink subframe, determining whether configuration information sent by a base station is received, the configuration information indicating that the base station configures the target subframe as a last subframe of a downlink transmission and uses a partial subframe structure, and indicating a number of symbols occupied by the target subframe; and in response that the configuration information is received, selecting the last symbol in the target subframe as the target symbol;

send the SRS through the target symbol.

12. The terminal of claim 11, wherein the at least one processor further:

in response that the target subframe is an uplink subframe, selects a last symbol in the target subframe as the target symbol.

13. The terminal of claim 12, wherein the at least one processor further:

receives a high layer signaling or a downlink control information (DCI) signaling sent by the base station for indicating an uplink subframe configuration, and determines whether the target subframe is an uplink subframe according to the high layer signaling or the DCI signaling; or receives an uplink scheduling instruction sent by the base station, and determines whether the target subframe is an uplink subframe according to an indication of the uplink scheduling instruction.

14. The terminal of claim 11, wherein the at least one processor further:

in response that at least the last symbol in the target subframe belongs to an Uplink Pilot Time Slot (UpPTS), selects the last symbol in the target subframe as the target symbol.

15. The terminal of claim 14, wherein the at least one processor further:

determines whether a subframe that is located after the target subframe and is adjacent to the target subframe, is a first uplink subframe when a downlink subframe is converted into an uplink subframe;

in response that the subframe that is located after the target subframe and is adjacent to the target subframe, is the first uplink subframe when the downlink subframe is converted into the uplink subframe, determines that at least the last symbol in the target subframe belongs to the UpPTS.

16. The terminal of claim 11, wherein the at least one processor further:

in response that the target subframe is not configured to be any subframe, selects the last symbol in the target subframe as the target symbol.

17. The terminal of claim 11, wherein the at least one processor further:

determines whether a primary synchronization signal (PSS) and a secondary synchronization signal (SSS) are detected in the target subframe in response that the target subframe is in a discovery reference signal (DRS) measurement timing configuration and the target subframe is not a 0 subframe and a 5 subframe in the frame structure 3;

selects the last symbol in the target subframe as the target symbol in response that the PSS and the SSS are not detected in the target subframe or the SSS and the PSS are respectively detected before the eighth symbol and the ninth symbol in the target subframe.

18. The terminal of claim 11, wherein the at least one processor further:
  sends the SRS directly through the target symbol without a channel detection; or
  at least performs a channel detection process for 16 us+M*9 us, and sends the SRS through the target symbol when the channel is detected to be idle, M being 1 or 2.

19. The terminal of claim 11, wherein the at least one processor further:
  receives a RRC configuration signaling sent by the base station, determines a location of the target subframe according to a sending period and an initial sending position of the SRS in the RRC configuration signaling; or
  receives a DCI configuration signaling sent by the base station, and determines the location of the target subframe according to the DCI configuration signaling.

20. A non-transitory storage medium having stored thereon instructions that, when executed by a processor of a terminal, causes the processor of the terminal to perform a Sounding Reference Signal (SRS) sending method when a Long Term Evolution (LTE) system works with a frame structure 3 in an unlicensed frequency band, the SRS sending method comprising:
  determining a type of a target subframe to send an SRS;
  selecting a target symbol in the target subframe for sending the SRS according to the type of the target subframe, comprising:
    in response that the target subframe is a downlink subframe, determining whether configuration information sent by a base station is received, the configuration information indicating that the base station configures the target subframe as a last subframe of a downlink transmission and uses a partial subframe structure, and indicating a number of symbols occupied by the target subframe; and
    in response that the configuration information is received, selecting the last symbol in the target subframe as the target symbol;
  sending the SRS through the target symbol.

* * * * *